United States Patent [19]

Takahashi et al.

[11] Patent Number: 4,826,271
[45] Date of Patent: May 2, 1989

[54] ROTATIONAL POLYGON MIRROR AND METHOD OF MANUFACTURING THE SAME

[75] Inventors: Kimio Takahashi, Machida; Norihisa Saito; Kunio Takada, both of Tokyo, all of Japan

[73] Assignee: Canon Kabushiki Kaisha, Tokyo, Japan

[21] Appl. No.: 768,219

[22] Filed: Aug. 22, 1985

[30] Foreign Application Priority Data

Aug. 31, 1984 [JP] Japan ................................. 59-180491
Aug. 31, 1984 [JP] Japan ................................. 59-180492
Aug. 31, 1984 [JP] Japan ................................. 59-180493
Aug. 31, 1984 [JP] Japan ................................. 59-180494
Aug. 31, 1984 [JP] Japan ................................. 59-180496

[51] Int. Cl.⁴ ............................................. G02B 26/10
[52] U.S. Cl. .................................... 350/6.8; 350/320; 350/609
[58] Field of Search .................... 350/1.6, 1.7, 6.1, 6.7, 350/6.8, 320, 609; 428/429, 632; 156/294; 264/1.1, 1.9, 2.3, 2.4

[56] References Cited

U.S. PATENT DOCUMENTS

| 4,101,365 | 7/1978 | Fisli | 350/6.8 |
| 4,205,100 | 5/1980 | Fisli | 350/6.8 |
| 4,340,646 | 7/1982 | Ohno et al. | 350/320 |
| 4,348,463 | 9/1982 | Ohno et al. | 350/320 |
| 4,448,855 | 5/1984 | Senaha et al. | 350/320 |
| 4,592,622 | 6/1986 | Hashimoto et al. | 350/6.8 |

FOREIGN PATENT DOCUMENTS

58-184902 10/1983 Japan ................................. 350/6.7

Primary Examiner—John K. Corbin
Assistant Examiner—Loha Ben
Attorney, Agent, or Firm—Fitzpatrick, Cella, Harper & Scinto

[57] ABSTRACT

A rotational polygon mirror and a method of manufacture thereof comprising a base member having a polygonal pole-like portion, the base member being formed of a relatively light-weight material which can be easily molded into a complicated shape, and a coating film which is provided on one or more side surfaces of the polygonal pole-like portion and on which a reflecting mirror surface is formed, the coating film being of at least one layer structure.

23 Claims, 1 Drawing Sheet

ROTATIONAL POLYGON MIRROR AND METHOD OF MANUFACTURING THE SAME

BACKGROUND AND SUMMARY OF THE INVENTION

This invention relates to a rotational polygon mirror used in the optical apparatus or the like of a laser scanning system and to a method of manufacturing the same.

A rotational polygon mirror is mounted on the optical apparatus or the like of a laser scanning system and is used to change, for example, the course of the laser beam and cause the laser beam to scan on a light-receiving surface and typically, a rotational polygon mirror of a structure in which the side surface of a polygonal member whose cross-sectional comprises a regular polygon such as a regular hexagon is formed as a reflecting mirror surface is known.

Such a rotational polygon mirror has heretofore been manufactured by a method comprising shaping an optical glass member into a regular polygonal shape by a step such as grinding or polishing, and further polishing the side surface of the polygonal pole to thereby form a reflecting mirror surface, or a method comprising cutting and shaping a member formed by a metal material such as an aluminum alloy into the form of a polygonal pole whose cross-section is of a regular polygonal shape, and super-precision-cutting the side surface thereof by the use of diamond cutting tool to thereby form a reflecting mirror surface.

However, in the manufacture of the rotational polygon mirror by the above-described methods, the shaping of a polygonal pole-like base member by the cutting or the like or an optical glass or metal material member and the formation of a reflecting mirror surface of good accuracy by polishing or cutting have required much labor and time and a high-degree technique and particularly, the formation of the other portion than the reflecting mirror surface into a complicated shape has required a more complicated and higher-degree step, which in turn has led to a problem of higher cost of manufacture.

Also, the use of optical glass or a metal material as the base member has led to the heavy weight of the rotational polygon mirror itself, and this has been a hindrance in reducing the weight of the apparatus to which the laser rotational polygon mirror is to be mounted.

It is an object of the present invention to provide a rotational polygon mirror which can be simply formed at a low cost of manufacture and a method of manufacturing the same.

It is another object of the present invention to provide a rotational polygon mirror which is light in weight and which can be simply formed at a low cost of manufacture and a method of manufacturing the same.

It is still another object of the present invention to provide a method which can simply form even a rotational polygon mirror in which the other portion than a reflecting mirror surface is complicated, at a low cost of manufacture.

The above objects of the present invention are achieved by the following rotational polygon mirror and the following method of manufacturing the same.

That is, the present invention is a rotational polygon mirror having a polygonal pole-like portion on one or more of whose side surfaces a reflecting mirror surface is provided, characterized by a base member having a polygonal pole-like portion formed of a light-weight material which can be easily molded into a complicated shape, such as resin, a composite resin material comprising chiefly resin, aluminum or an aluminum alloy, a coating film which is provided on one or more side surfaces of the polygonal pole-like portion and on which the reflecting mirror surface is formed, and a coating film functioning as a reflection increasing film and/or a protective film provided on the reflecting mirror surface as desired, and a method of manufacturing the rotational polygon mirror which comprises the steps of forming a base member having a polygonal pole-like portion from said material, forming a coating film of single-layer or multi-layer structure on a portion of said base member on which at least the reflecting mirror surface is formed, forming at least the portion of said coating film which forms the reflecting mirror surface into a reflecting mirror surface as desired in a case where, in the step of forming said coating film, the portion on which the reflecting mirror surface is formed does not yet have sufficiently the accuracy necessary for the reflecting mirror surface, and providing a coating film functioning as a reflection increasing film and/or a protective film on said reflecting mirror surface as desired.

DESCRIPTION OF THE PREFERRED EMBODIMENTS

The present invention will hereinafter be described in greater with respect to a rotational polygon mirror having a regular hexagonal pole-like shape and by reference to the drawings.

Figure 1A:
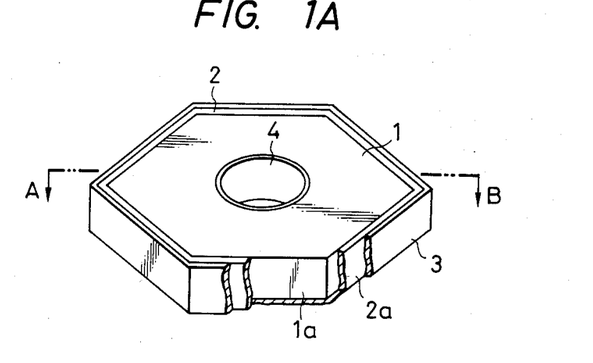
FIG. 1A is a plan view of a rotational polygon mirror formed by the method of the present invention.
Figure 1B:
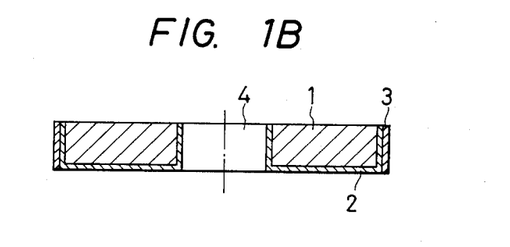
FIG. 1B is a cross-sectional view taken along line A–B in FIG. 1A.

FIG. 1A is a perspective view of a first embodiment of the rotational polygon mirror of the present invention, and FIG. 1B is a cross-sectional view taken along line A–B in FIG. 1A.

Reference numeral 1 designates a base member having a regular hexagonal pole-like shape. A through-hole 4 for installing a rotational polygon mirror coaxial with the center axis of the regular hexagon on a rotary drive shaft is provided at the center of the base member 1.

This base member 1 is formed of resin or a composite resin material comprising chiefly resin.

Reference numeral 2 denotes a metal coating film consisting of a metal such as Al, Cu, Ni, Ag or Au. Of this coating film, the surface of a portion 2a provided on the side of the hexagonal pole is treated by cutting work and is endowed with surface accuracy as a reflecting mirror surface required for forming a rotational polygon mirror.

Reference numeral 3 designates a coating film functioning as a reflection increasing film and/or a protective film provided on the surface 2a of the reflecting mirror as desired. The coating film 3 is provided at least on the metal coating film 2 whose surface is treated by cutting.

The rotational polygon mirror of such construction according to the present invention can be manufactured in the following manner.

First, the base member 1 having a regular hexagonal pole-like shape as shown in FIG. 1A is molded.

PMMA (polymethyl methacrylate), ABS resin, polycarbonate or the like may be mentioned as a material which can be molded to form base member 1, and a resin material made into a composite by other material such as glass fiber, carbon fiber or the like may be mentioned as the composite resin material comprising chiefly resin.

The base member 1 can be molded by the use of a material suitably selected from among the above-mentioned materials in conforming with the strength required of the rotational polygon mirror, the usage of the rotational polygon mirror or the matching with the material used as the metal coating film which will alter be described, and by the use of one of various resin molding methods such as the injection molding method, the compression molding method and the casting method.

Thus, in the first embodiment of the manufacturing method of the present invention, the base member 1, is molded by a molding method using resin and therefor,, the base member 1 can be easily made into any desired shape and particularly, even a base member in which the portion other than the portion on which the reflecting mirror surface is formed has a complicated shape can be easily formed.

Subsequently, the coating film 2 consisting of a metal material is formed on the portion 1a the thus formed base member 1 on which at least the reflecting mirror surface is formed, as shown in FIGS. 1A and 1B. In the embodiment shown, metal coating films are also formed on the side surface and bottom surface of the base member 1, and the strength of the base member 1 can be enhanced by thus forming a metal coating film also on the bottom surface of the base member 1.

The metal material usable for the formation of the coating film in the method of the first embodiment may be any material which can form a continuous coating film on the base member consisting of the aforementioned resin material and which is suited for the super-precision diamond cutting to be effected subsequently and which can form a reflecting mirror surface of good accuracy by said cutting step, and a metal material such as Al, Cu, Ni, Ag or Au may be mentioned as such material.

A metal material can be suitably selected from among said metal materials in accordance with the material forming the base member 1 to reinforce the hardness and strength of the base member 1.

The metal coating film formed in the method of the first embodiment may be of a single-layer construction or a multilayer construction. In the case of the multilayer construction, all the layers may be formed of the same material or at least one of the layers may be formed of a material different from the material forming the other layers, and also in the case of the multi-layer construction, by suitably selecting the materials forming the layers, the contact strength of the base member, the metal coating film and the protective layer formed subsequently can be enhanced or the hardness and strength of the base member can be reinforced.

To form a metal coating film in the method of the first embodiment, one of the aforementioned metal materials can be used to form a metal coating film of a desired construction on at least a portion of the base member 1 on which the reflecting mirror surface is formed, by a method such as the chemical plating method, the electroplating method or the evaporation method, and the thickness of the metal coating film on the surface of which the reflecting mirror surface is formed is made sufficient to form the reflecting mirror surface on the surface of said coating film by the super-precision cutting to be effected subsequently, and may usually be of the order of 50 $\mu$m–100 $\mu$m.

The surface formed as the reflecting mirror surface of the thus formed metal coating film is subjected to the super-precision cutting process using a diamond tool or the like in such a range that said metal coating film is not completely removed from the base member 1, in a case where the metal coating film is of a single-layer construction or in such a range that the outermost layer of the coating film is not completely removed from the base member 1, in a case where the metal coating film is of a multi-layer construction, and there is formed the reflecting mirror surface 2a having the necessary accuracy.

In the method of the first embodiment, a coating film 3 having the function of enhancing the reflecting function of the reflecting mirror surface 2a or protecting the reflecting mirror surface is formed on the reflecting mirror surface 2a formed in the above-described manner and thus, there can be obtained the rotational polygon mirror as shown in FIGS. 1A and 1B.

A thin film forming method such as the evaporation method or the sputtering method using a material such as Al, Cu, Au, Ag, $SiO_2$, $MgF_2$ and $Al_2O_3$ can be applied for the formation of said coating film 3.

The method of the first embodiment will hereinafter be described in greater detail.

First, ABS resin was used and a polygon polelike base member was molded by the injection molding method. Thereafter, chemical nickel plating of a thickness of 100 $\mu$m was applied to the surface of said polygonal polelike base member, and subsequently, an end surface (bottom surface) at a right angle to the side surface of the polygonal pole which provides a mounting and working reference surface was cut by 50 $\mu$m by super-precision cutting using a diamond tool, and the thus cut reference surface was mounted on a cutting jig and the metal coating film on the side surface of the polygonal pole was cut by 50 $\mu$m, whereby a reflecting mirror surface of surface roughness R max. of 0.02 $\mu$m or less and a degree of planarity of $\lambda/5$ (0.12 $\mu$m or less) was formed.

Further, the base member was washed to remove the oil used for cutting chiefly from the cut surface, and Cu and $SiO_2$ films for increased reflection and protection of the reflecting mirror surface were applied to the base member by evaporation, whereby the rotational polygon mirror of the first embodiment was formed.

The thus formed rotational polygon mirror could be manufactured at a cost of manufacture lower by about 40% than the cost of the conventional rotational polygon mirror, due to the inexpensiveness of the base member portion and the simplification of the manufacturing process thereof. Further, the weight of the rotational polygon mirror could be reduced to about 1/2.5 of the weight of the conventional rotational polygon mirror.

Description will now be made of the rotational polygon mirror of a second embodiment and a method of manufacturing the same.

The second embodiment differs from the first embodiment in that the base member is molded by the use of aluminum or an aluminum alloy and by a molding method using a mold. Accordingly, the second embodiment will hereinafter be described by the use of the same figure and reference numerals as those for the first embodiment.

The rotational polygon mirror of the second embodiment can be manufactured in the following manner.

First, the base member 1 having a regular hexagonal pole-like shape as shown in FIG. 1A is molded by the die-casting method using aluminum or an aluminum alloy material or a molding method using a mold, such as the compression molding method or the injection molding method.

The material usable for molding of the base member 1 is an aluminum material or an aluminum alloy material moldable by the die-casting or the molding method using a mold, such as the compression molding method or the injection molding method as described above, and specifically, an aluminum material such as ADC10, A1070 or A6061, or an aluminum alloy material may be mentioned. When molding the base member 1, from among these materials, a material may be suitably selected as the material for molding the base member 1 in conformity with the strength required of the formed rotational polygon mirror, the usage of the rotational polygon mirror or the matching with the material used as a metal coating film which will hereinafter be described.

Thus, again in the method of the second embodiment, the base member 1 is molded by the die-coating method using aluminum or an aluminum alloy material or the molding method using a mold, such as the compression molding method or the injection molding method and therefore, the base member 1 can be easily made into a desired shape and particularly, even a base member in which the other portion than the portion on which the reflecting mirror surface is formed has a complicated shape can be easily formed.

The metal material usable for the formation of the coating film 2a in the method of the second embodiment may be any material which can form a continuous coating film on the base member consisting of aluminum or an aluminum alloy material and which is suited for super-precision diamond cutting to be effected subsequently and can form a reflecting mirror surface of good accuracy by the cutting step, and a metal material such as Al, Cu, Ni, Ag or Au may be mentioned.

The method of the second embodiment will hereinafter be described in greater detail with respect to an example thereof.

First, an aluminum material ADC10 was molded into the shape of a polygonal pole by die-casting and was used as the base member. Thereafter, chemical nickel plating of a film thickness of 100 μm was applied to said polygonal pole-like base member, whereafter an end surface (bottom surface) at a right angle to the side surface of the polygonal pole which provides a mounting and working reference surface was cut by 50 μm by super-precision cutting using a diamond tool, and subsequently, the base member was mounted on a cutting jig through the thus cut reference surface, and the metal coating film on the side surface of the polygonal pole-like base member was cut by 50 μm, whereby a reflecting mirror surface of surface roughness R max. of 0.02 or less and a degree of planarity of λ/5 (0.12 μm or less) was formed.

Further, the base member was washed to remove the oil used for cutting from the base member, whereafter Cu and SiO$_2$ films for the increased reflection and protection of the formed reflecting mirror surface were applied to the reflecting mirror surface by the evaporation method, whereby a rotational polygon mirror was formed.

The thus formed rotational polygon mirror could be manufactured at a cost of manufacture lower by about 30% than the cost of the conventional rotational polygon mirror, due to the inexpensiveness of the base member and the simplification of the manufacturing process thereof.

Description will not be made of the rotational polygon mirror of a third embodiment and a method of manufacturing the same.

The third embodiment differs from the second embodiment in that the coating film is a resin coating film. Accordingly, the third embodiment will hereinafter be described by the use of the same figure and reference numerals as those for the second embodiment.

The base member 1 is molded by the use of aluminum or an aluminum alloy material and by a molding method using a mold.

Reference numeral 2 designates a resin coating film formed of resin such as PMMA (polymethyl methacrylate) or polycarbonate. Of this coating film the surface of a portion 2a provided on the side of the polygonal pole is endowed with the surface accuracy as a reflecting mirror surface required of a rotational polygon mirror to be formed.

A coating film 2 consisting of a resin material is formed on a portion 1a of the base member 1 on which at least the reflecting mirror surface is thus formed, as shown in FIGS. 1A and 1B, whereby the reflecting mirror surface is provided, but in the example shown, resin coating films are formed on both of the side surface and the underside of the base member 1.

The resin material usable in the formation of the coating film in the method of the third embodiment may be any material which can form a continuous coating film having a surface of predetermined reflecting mirror surface accuracy on the base member consisting of aluminum or an aluminum alloy, and for example, the resin materials previously mentioned can be used.

To form a resin coating film in the method of the third embodiment, use may be made of the aforementioned resin material and, by a method such as the casting or the injection molding, a resin coating film having a surface of desired reflecting mirror surface accuracy can be formed on the portion 1a of the base member 1 on which at least the reflecting mirror surface is formed.

The method of the third embodiment will hereinafter be described in greater detail with respect to an example thereof.

An aluminum material ADC10 was molded into a polygonal pole-like shape by die-casting, whereafter PMMA was applied to a thickness as small as 0.5 mm–1 mm to the side surface by the injection molding to reduce the mold shrinkage. Thereby, the surface accuracy of the mirror surface finished with high accuracy could be transferred and therefore, a surface of surface roughness R ma. of 0.02 μm and a degree of planarity of λ/5 (0.12 μm or less) was completed. Cu and SiO$_2$ films for increased reflection and protection were applied to the thus formed reflecting mirror surface by evaporation, whereby the rotational polygon mirror of the third embodiment was completed.

The thus obtained rotational polygon mirror could be manufactured at a cost of manufacture lower by about 50% than the cost of the conventional rotational polygon mirror due to the inexpensiveness of the base member itself, the simplified manufacture of the base member and the possibility of the diamond mirror surface cutting process being omitted.

Description will now be made of the rotational polygon mirror of a fourth embodiment and a method of manufacturing the same.

The the fourth embodiment differs from the third embodiment in that in the fourth embodiment, the resin coating film made into a reflecting mirror surface is formed particularly by a cutting process. Accordingly, the fourth embodiment will hereinafter be described by the use of the same figure and reference numerals as those for the third embodiment.

The base member 1 is molded by the use of aluminum or an aluminum alloy material and by a molding method using a mold.

Reference numeral 2 designates a resin coating film. Of the resin coating film, the surface 2a of a portion provided on the side surface of the polygonal pole is subjected to a cutting process by superprecision diamond cutting or the like and is endowed with the necessary surface accuracy for a reflecting mirror surface.

The coating film 2 consisting of resin is formed on a portion 1a of the base member on which at least the reflecting mirror surface is formed as shown in FIGS. 1A and 1B, and in the shown example, resin coating films are formed also on the side surface and bottom surfaces of the base member 1 and, by the resin coating film being thus formed also on the bottom surface of the base member, the strength of the base member 1 can be enhanced.

The resin usable for the formation of the coating film 2 in the method of the fourth embodiment may be any material which can form a continuous coating film on the base member consisting of said metal material and which is suited for super-precision diamond cutting to be effected subsequently and can form a reflecting mirror surface of good accuracy by the cutting process, and the coating film 2 can be formed of a resin such as PMMA (polymethyl methacrylate) or polycarbonate.

A material can be suitably selected from among said resins in conformity with the material forming the base member 1, thereby reinforce the hardness and strength of the base member 1.

To form the resin coating film 2 in the method of the fourth embodiment, use can be made of a resin forming material capable of forming the aforementioned resin and, by a method such as casting or injection molding, the resin coating film 2 can be formed on the portion of the base member 1 on which at least the reflecting mirror surface is formed.

The surface 2a of the resin coating film 2 formed in this manner on which the reflecting mirror surface is formed is subjected to a superprecision diamond cutting process in such a range that the resin coating film is not completely removed from the base member 1, whereby the reflecting mirror surface is formed.

The method of the fourth embodiment will hereinafter be described in greater detail with respect to an example thereof.

An aluminum material ADC10 was used and molded into a polygonal pole-like shape by die-casting, and it was used as the base member. Thereafter, PMMA was applied to a thickness of 2 mm onto the side surface of the base member by injection molding, and was cut by 50 $\mu$m by superprecision cutting using a diamond tool, whereby it was finished to a surface roughness R max. of 0.02 $\mu$m or less and a degree of planarity of $\lambda/5$ (0.12 $\mu$m or less). Cu and $SiO_2$ films for the increased reflection and protection were further applied thereonto by evaporation, whereby the rotational polygon mirror of the fourth embodiment was completed.

The rotational polygon mirror obtained by this manufacturing method could be manufactured at a cost of manufacture lower by about 40% than the cost of the conventional rotational polygon mirror due to the inexpensiveness of the base member itself and the simplified manufacture of the base member.

Description will now be made of the rotational polygon mirror of a fifth embodiment and a method of manufacturing the same.

The fifth embodiment differs from the fourth embodiment in that a resin molding material is disposed between the base member and a shaping mold having a surface for shaping a mirror surface and a resin coating films is formed on the base member by the base member and the shaping mold. Accordingly, a part of the fifth embodiment will hereinafter be described by the use of the same figure and reference numerals as those for the fourth embodiment.

The base member 1 is molded by the use of aluminum or an aluminum alloy and by a molding method using a mold.

Reference numeral 2 designates a resin coating film consisting of resin such as PMMA (polymethyl methacrylate) or epoxy resin. Of this resin coating film, the surface of the portion 2a provided on the side surface of the polygonal pole is endowed with the necessary surface accuracy for a reflecting mirror surface by molding using a mold.

Figure 2A:
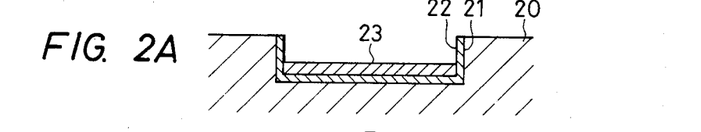
FIGS. 2A and 2B are cross-sectional views for illustrating the step of molding the resin coating film of another embodiment.
Figure 2B:
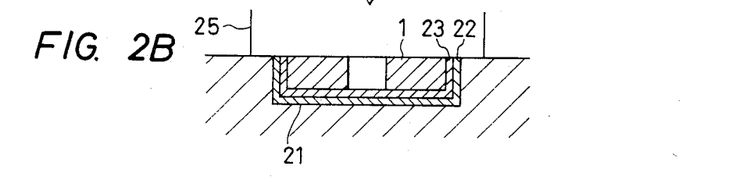

The formation of the resin coating film 2 in the method of the fifth embodiment can be accomplished by a method comprising disposing, as shown in FIG. 2A, a material 23 for forming said resin coating film in a shaping mold 20 having a molding surface 21 corresponding to the surface accuracy required of the formed reflecting mirror surface and preferably covered with a parting agent 22 and having a shape corresponding to the base member 1, inserting the base member 1 held by a holding member 25 into the mold 20, as shown in FIG. 2B, molding the resin forming material 23 into a predetermined shape by the base member 1 and the molding surface 21 of the mold 20, hardening the material 23 and forming the resin coating film 2.

The surface 2a of the resin coating film 2 thus molded by the molding surface 21 of the shaping mold 20 has transferred thereto the planarity accuracy of the molding surface 21 of the shaping mold, whereby a reflecting mirror surface of good accuracy is formed on a predetermined portion of the surface of the resin coating film 2.

The method of the fifth embodiment will hereinafter be described in greater detail with respect to an example thereof.

An aluminum material ADC10 was molded into a polygonal pole-like shape by die-casting and was used as the base member. Thereafter, epoxy resin was poured between the mirror surface mold finished to the necessary accuracy and the base member with a clearance of 0.2–0.3 mm kept therebetween and was hardened and applied to the base member. The base member having the resin applied thereto was removed from the mold by a method such as heat shock. The accuracy of the mirror surface mold was transferred by this method and a surface of surface roughness R ma. of 0.2 $\mu$m or less and a degree of planarity of λ/5 (0.12 μm or less) was made as a reflecting mirror surface on the side surface of the base member. Cu and SiO$_2$ films for the increased reflection and protection were further applied thereonto by evaporation, whereby the rotational polygon mirror of the fifth embodiment was completed.

The rotational polygon mirror obtained by this manufacturing method could be manufactured at a cost of manufacture lower by about 50% than the cost of the conventional rotational polygon mirror due to the inexpensiveness of the base member itself, the simplified manufacture of the base member and the possibility of the diamond mirror surface cutting process being omitted.

While the rotational polygon mirror of the present invention has been described with a rotational polygon mirror having a regular hexagonal pole-like shape as an example, the shape of the rotational polygon mirror of the present invention is not limited thereto, but various desired shapes can be adopted.

According to the method of the present invention as described above, a base member is molded chiefly by a molding process using a resin material, aluminum or the like, and a coating film consisting of a metal material or a resin material is further formed on a predetermined portion of the base member and the coating film is subjected to super-precision cutting or the like as required to thereby form a reflecting mirror surface and therefore, unlike the conventional method comprising cutting a glass material or a metal material to form a base member, and polishing the base member to thereby form a reflecting mirror surface, the base member and the reflecting mirror surface can be molded more simply and within a shorter time and also, the other portion than the portion on which the reflecting mirror surface is formed can be simply molded into a complicated shape and thus, it has become possible to manufacture a rotational polygon mirror at a low cost of manufacture.

Also, the base member is formed of a light-weight material, i.e., resin or a composite resin material consisting chiefly of resin, and aluminum or an aluminum alloy or the like and therefore, it has become possible to form a light-weight rotational polygon mirror.

We claim:

1. A rotational polygon mirror comprising:
a base member having a polygonal pole-like portion, said base member being formed of a relatively light-weight material which can be easily molded into a relatively complicated shape, and said polygonal pole-like portion having at least one side surface where a surface other than a reflecting mirror surface is formed; and
a coating film provided on said at least one side surface of said polygonal pole-like portion and on an entire bottom surface thereof, said film being of at least one layer structure, and on an opposite surface to a surface of said film in contact with said at least one side surface of said polygonal pole-like portion a reflecting mirror surface is being formed.

2. A rotational polygon mirror according to claim 1, further comprising a coating film provided on said reflecting mirror surface, said film acting as a film to enhance reflecting function of said reflecting mirror surface and/or to protect said reflecting mirror surface.

3. A rotational polygon mirror according to claim 1, wherein said film is a multi-layer structure.

4. A rotational polygon mirror according to claim 1, wherein said base is composed of a resinous material comprising mainly resin.

5. A rotational polygon mirror according to claim 1, wherein said base is composed of an aluminum material.

6. A rotational polygon mirror according to claim 1, wherein said film where a reflecting mirror surface is formed is a metal coating film.

7. A rotational polygon mirror according to claim 6, wherein said reflecting mirror surface of said film is formed by cutting.

8. A rotational polygon mirror according to claim 1, wherein said film where said reflecting mirror surface is formed is a resin coating film.

9. A rotational polygon mirror according to claim 8, wherein said reflecting mirror surface of said film is formed by transferring planarity-accuracy of a molding surface of a shaping mold, said molding surface having highly finished planarity-accuracy.

10. A rotational polygon mirror according to claim 8, wherein said reflecting mirror surface of said film is formed by cutting.

11. A rotational polygon mirror according to claim 8, wherein said reflecting mirror surface of said film is formed so as to inherit necessary planarity-accuracy from a shaping mold by means of molding.

12. A method of manufacturing a rotational polygon mirror, comprising the steps of:
molding a base member having a polygonal pole-like portion from a relatively light-weight material which can be easily molded into a relatively complicated shape;
disposing a resin material in a shaping mold having a molding surface, there being a clearance of 0.2-0.3 mm between said surface and said base member, corresponding to a planarity-accuracy required of a reflecting mirror surface and having a shape corresponding to said base member; and
forming a coating film a surface of which opposite to a surface thereof in contact with said base member is a reflecting mirror surface, on at least one side surface of said polygonal pole-like portion of said base member, by inserting said base member into said shaping mold, shaping said resin material into a predetermined shape by said molding surface of said shaping mold and said base member, and said resin material.

13. A method according to claim 12, wherein said molding surface is covered with a parting agent.

14. A method of manufacturing a rotational polygon mirror according to claim 12, wherein said base member is molded from a resinous material comprising mainly resin.

15. A method of manufacturing a rotational polygon mirror according to claim 12, wherein said base member is molded from an aluminum material by a mold.

16. A method of manufacturing a rotational polygon mirror according to claim 12, further comprising the step of providing another coating film on said reflecting mirror surface, and wherein said another coating film acts to enhance a reflective function of said reflecting mirror surface and/or to protect said reflecting mirror surface.

17. A method of manufacturing a rotational polygon mirror comprising the steps of:
molding a base member having a polygonal pole-like portion from a relatively light-weight material which can be easily molded into a relatively complicated shape;

forming a coating film of at least one layer structure on at least one side surface of said polygonal pole-like portion and on an entire bottom surface thereof; and precision-cutting an opposite surface to a surface of said film in contact with said at least one side surface of said polygonal pole-like portion so as to form a reflecting mirror surface.

18. A method of manufacturing a rotational polygon mirror according to claim 12, further comprising the step of providing another coating film on said reflecting mirror surface, and wherein said another coating film acts to enhance a reflective function of said reflecting mirror surface and/or to protect said reflecting mirror surface.

19. A method of manufacturing a rotational polygon mirror according to claim 17, wherein said film is formed on a multi-layer structure.

20. A method of manufacturing a rotational polygon mirror according to claim 17, wherein said base is molded from a resinous material comprising mainly resin.

21. A method of manufacturing a rotational polygon mirror according to claim 17, wherein said base member is molded from an aluminum material by a mold.

22. A method of manufacturing a rotational polygon mirror according to claim 17, wherein said film is a metal coating film.

23. A method of manufacturing a rotational polygon mirror according to claim 17, wherein said film is a resin coating film.

* * * * *

UNITED STATES PATENT AND TRADEMARK OFFICE
CERTIFICATE OF CORRECTION

PATENT NO. : 4,826,271

DATED : May 2, 1989

INVENTOR(S) : Takahashi, et al.

It is certified that error appears in the above-identified patent and that said Letters Patent is hereby corrected as shown below:

On the title page

[75]    Inventors:

"Kimio Takahashi, Machida;" should read
--Kimio Takahashi, Tokyo;--

COLUMN .2:

Line 38, "greater" should read --greater detail--.

COLUMN 3:

Line 5, "form base" should read --form the base--.

Line 14, "or the matching" should read --for matching--.

Line 15, "alter" should read --later--.

Line 22, "therefor,," should read --therefore,--.

COLUMN 4:

Line 33, "polygon" should read --polygonal--.

COLUMN 6:

Line 23, "film" should read --film,--.

Line 59, "R ma." should read --R max.--.

UNITED STATES PATENT AND TRADEMARK OFFICE
CERTIFICATE OF CORRECTION

PATENT NO. : 4,826,271

DATED : May 2, 1989

INVENTOR(S) : Takahashi, et al.

It is certified that error appears in the above-identified patent and that said Letters Patent is hereby corrected as shown below:

COLUMN 7:

Line 7, delete "the" (first occurrence).

Line 20, "superprecision" should read --super-precision--.

Line 29, "surfaces" should read --surface--.

Lines 55 and 67, "superprecision" should read --super-precision--.

COLUMN 8:

Line 19, "films" should read --film--.

Line 68, "surface roughness R ma." should read --surface roughness R max.--.

COLUMN 11:

Line 12, "claim 12," should read --claim 17,--.

UNITED STATES PATENT AND TRADEMARK OFFICE
CERTIFICATE OF CORRECTION

PATENT NO. : 4,826,271

DATED : May 2, 1989

INVENTOR(S) : Takahashi, et al.

It is certified that error appears in the above-identified patent and that said Letters Patent is hereby corrected as shown below:

COLUMN 12:

Line 3, "on" should read --as--.

Signed and Sealed this

Twenty-fifth Day of September, 1990

Attest:

HARRY F. MANBECK, JR.

Attesting Officer — Commissioner of Patents and Trademarks